May 29, 1934. F. A. STEVENS 1,960,321
OPHTHALMIC MOUNTING
Filed Oct. 20, 1930
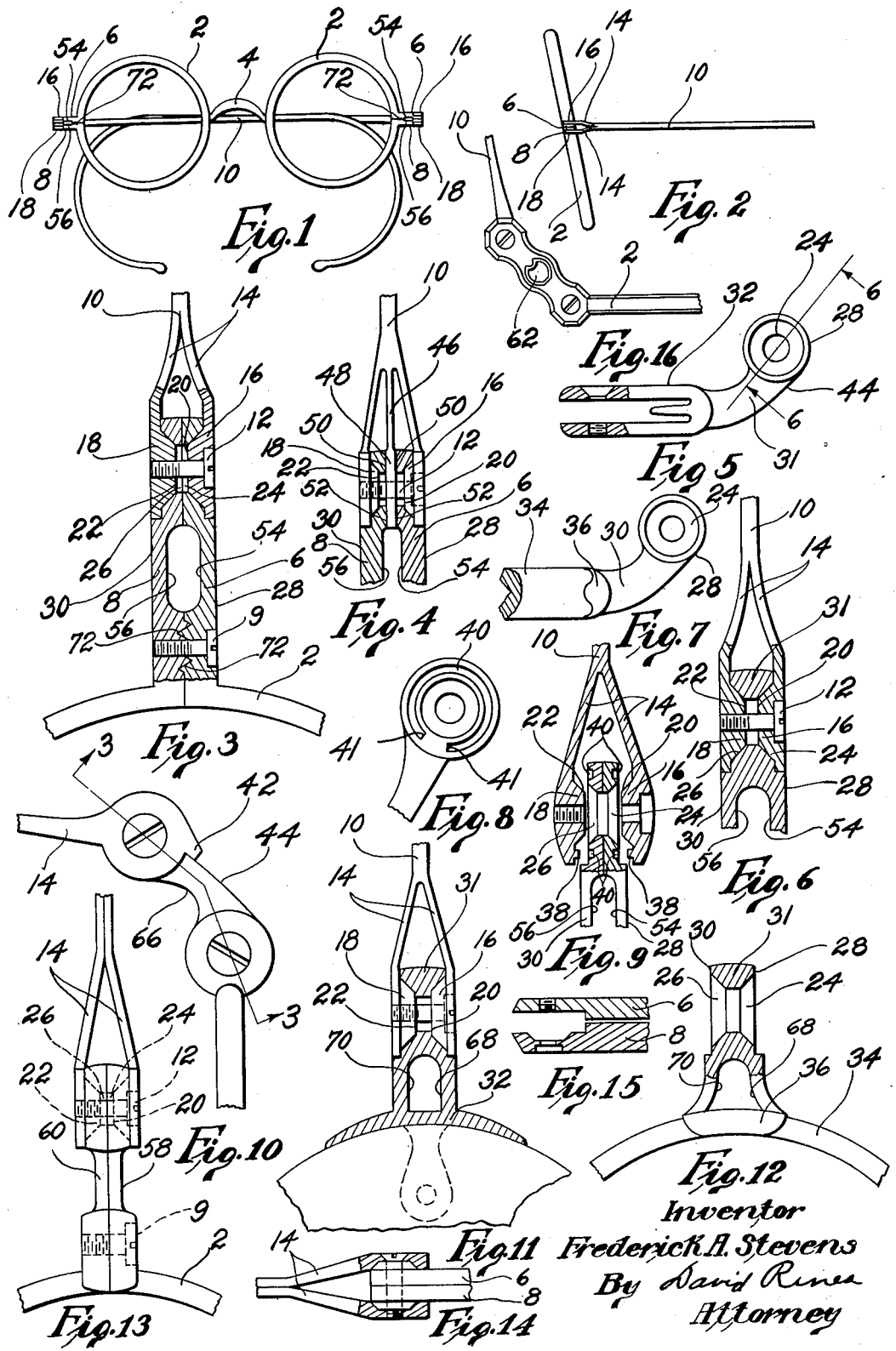
Inventor
Frederick A. Stevens
By David Rines
Attorney Patented May 29, 1934

1,960,321

UNITED STATES PATENT OFFICE 1,960,321

OPHTHALMIC MOUNTING

Frederick Arthur Stevens, Providence, R. I.

Application October 20, 1930, Serial No. 489,818

23 Claims. (Cl. 88—53)

The present invention relates to ophthalmic mountings, and more particularly to temples and temple connections.

Among the objects of the invention are to provide greater adjustability and greater durability, while combining lightness with strength. Other objects are to provide a greater bearing surface for a two-armed temple, and an improved construction for preventing loosening of the temple-holding screw. Further objects will be explained hereinafter and will be particularly pointed out in the appended claims.

One of the serious drawbacks of spectacles is the loosening of the temples. Many proposals have been made for eliminating this difficulty, but temples loosen as much today as they ever did. A principal cause of this trouble is that the temple-holding screw is subjected to constant frictional rubbing and wear during the turning of the temples, and this causes the screw to become more or less unthreaded. A very slight unthreading of this screw will cause a very loose temple.

One of the objects of the present invention is to improve upon temples and temple bearings of the above-described character to the end that their efficiency shall be increased while, at the same time, improving their appearance.

Another difficulty with present-day mountings is connected with the angling of the temples, permitting the lenses to be held before the eyes at any desired tilt. It is customary to effect this with pliers, but as end pieces are comparatively thick, it requires considerable force so to angle them, with the result that the end pieces often become broken or, at least, marred in appearance by plier marks.

A further object of the present invention, therefore, is to improve upon spectacles of this character, so as to render them more easily adapted to the angling of the temples. Here, too, this result is attained in a novel manner that incidentally enhances the appearance of the temple.

With these and other objects in view, the nature of which will appear from the following description, taken in connection with the accompanying drawing, the invention consists of the improved ophthalmic mounting preferred embodiments and modifications of which are hereinafter described, illustrated in the accompanying drawing and defined in the appended claims.

The invention will now be explained in connection with the accompanying drawing, in which Fig. 1 is a front elevation and Fig. 2 is a side elevation of a pair of spectacles, upon a smaller scale than in the other vews; Fig. 3 is a section taken upon the line 3—3 of Fig. 10, looking in the direction of the arrows; Fig. 4 is a similar, fragmentary section of a modification; Fig. 5 is a plan of a further modification; Fig. 6 is a section taken upon the line 6—6 of Fig. 5, looking in the direction of the arrows, and shows also a temple in position; Figs. 7 and 8 are plans similar to Fig. 5 of still other modifications; Fig. 9 is a section similar to Fig. 4 of the modification shown in Fig. 8; Fig. 10 is a plan of the modification shown in Fig. 3; Figs. 11 and 12 are sections similar to Fig. 3 of further modifications; Fig. 13 is a side elevation of still a further modification; and Figs. 14, 15 and 16 illustrate additional modifications.

A pair of spectacles is illustrated in Fig. 1 having split lens-holding rims 2 connected by a bridge 4 and each having two end pieces 6 and 8 at the respective ends of the rim secured together side by side, in contact, by a holding screw 9 extending through openings in the end pieces. A temple 10 swings about a pivoting screw 12.

A feature of the present invention contemplates an improved construction in which the temple 10 and the screw 12 turn as a unit, without any frictional engagement of the screw whatever during the turning of the temple. Several modifications of this invention will be hereinafter described, but the principle of the operation will be readily understood from a consideration of the preferred embodiment illustrated more particularly in Fig. 3. According to this preferred embodiment, the temple 10 is provided with a body portion and two long, adjustable arms 14 extending from the body portion and each having a tapering, or cone-shaped, projection 16 and 18, the projections extending towards each other, with the smaller ends 20 and 22 respectively, of the projections oppositely disposed. These projections are received in correspondingly shaped, countersunk recesses 24 and 26, respectively, provided in the opposite, outer faces 28 and 30, respectively, of the end pieces 6 and 8, the recesses being alined. The recesses conform in shape to the shape of the projections to provide bearing surfaces for the projections. The screw 12 extends freely through a smooth bore of the projection 16 and is threaded into a threaded bore of the other projection 18, the bores being alined. The projections are thus caused to bear tightly against the walls of the recesses 24 and 26. As the central portions of the recesses 24 and 26 are of greater diameter than the diameter of the bores, and as the screw 12 is of less diameter than that of the bores, the screw 12 is spaced from the walls of the alined recesses 24 and 26, particularly as the recesses and the bores are preferably concentric, so that the screw 12 does not bear against these walls during the turning of the temple, though holding the projections together pivotally against the bearing surfaces and moving pivotally with the projections as the temple turns. There is nothing, therefore, to cause loosening of the screw, not even a flexural movement of the projection-carrying arms 14 of the temple, for the tight fit of the projections 16 and 18 in their recess bearings 24 and 26 overcomes any tendency that might otherwise exist of their becoming loosened as a result of such flexural movement. More than that, the multiple-arm temple structure adds a dash of beauty to the mounting that is absent from present-day structures.

It will readily be understood that the invention is not restricted to the use of split rims, each having two end pieces 6 and 8, as any other type of lens-holding member and, in particular, a lens-holding member having only a single end piece, may also be employed. A single end piece 31 may, for example, be attached to a rimless lens-holding member 32, as shown in Figs. 5 and 11; or to an endless non-metal lens-holding rim 34, as by means of a metal clamp 36, illustrated in Figs. 7 and 12. In each case, the opposite faces 28 and 30 of the end pieces 6 and 8 or the end piece 31, as the case may be, are provided with the projection-receiving bearings in recesses 24 and 26 for the purpose before described. In each case, the circular, interlocking recesses and projections provide bearing surfaces for the swinging movement of the temple.

The arms 14 have been stated to be adjustable and are relatively long to effect this end. This adjustable feature is of particular value, because making it possible to have the projections 16 and 18 fit tightly in their bearings 24 and 26 irrespective of accidental defects of manufacture. Stability against loosening of the screw 12 during the pivoting of the temple is thus obtained irrespective of minuteness of parts and misalinement of the projections.

The pivotal movement of the temple may be limited by providing the arms 14 with projections 38 fitting in circular recesses 40 in the end piece 31 or end pieces 6 and 8 (Figs. 8 and 9) and provided with limiting walls 41, or preferably by means of a projection 42 on the temple that is adapted to engage against a wall 44 of the end piece or end pieces (Fig. 10).

According to the modification illustrated in Fig. 4, a third arm 46 is disposed between the arms 14 and having a portion 48 disposed between the projections 16 and 18. The end pieces 6 and 8 are, in this case, of smaller thickness, so as to provide a recess between them into which the portion 48 may extend and bear against the inner walls 50 and 52 of the recess.

It will further be understood that the projections 16 and 18 may be provided upon the end piece or end pieces, and the bearing recesses on the temple, as illustrated in Fig. 14; and that only a single projection and its corresponding bearing recess, whether upon the temple or the end piece or end pieces, may be employed, as illustrated in Fig. 15. A single-arm temple with conical projections could not be used upon single-ear end pieces.

The novel temple-and-end-piece construction of the present invention has the further advantage of providing a greater bearing surface for a given diameter than would otherwise be the case. The screw 12, controlling the frictional contact of the projections in their recesses, automatically effects alinement of the projections. The conical or tapering construction, furthermore, facilitates separation of the screw 12 from the walls, so as to produce no friction thereof against the said walls as it turns with the temple. The projections, furthermore, provide a greater length of screw thread in the projection 18 for a given thickness of end piece than is the case with ordinary mountings today in use. Finally, a positive journal bearing is provided, in which the holding screw 12 performs its tension-regulating function without itself serving as a journal bearing, thus preventing loosening.

According to a further feature of the present invention, the intermediate portions of the end pieces, between the screws 9 and 12, are made of smaller dimension. The ends of the end pieces, on both sides of these intermediate portions, are of normal size; but the thickness of the intermediate portion may be made less, as by cutting away the outer or the inner faces of the end pieces, or in other ways. The width of the intermediate portions of the end pieces may be lessened, instead. In all such cases, the end pieces are rendered readily adjustable.

According to the embodiment of the invention illustrated in Fig. 3, the said intermediate portions of the end pieces are cut away along their contacting faces, as illustrated at 54 and 56. The cutting away may, however, be made on the outer faces 28 and 30, as shown in Fig. 13, at 58 and 60. Or, the thickness of the end pieces may be preserved, but an inner portion 62 cut out therefrom, as illustrated in Fig. 16. The reduction in thickness is in this case sidewise, instead of edgewise. The thinning effect may be produced in the side of the end pieces, as between the sides 44 and 66, Fig. 10. The same results may, of course, be produced in the single-end-piece constructions. Thus, Figs. 11 and 12 show recesses having walls 68 and 70 corresponding to the cut-away walls 54 and 56 of Fig. 3.

The bifurcated arrangement, both of the arms 14 and the end pieces separated by the walls 68 and 70, provides not merely for adjustment, but also for lightness, as well as strength, besides improving the appearance of the mounting. By reason of the bifurcated arrangement in Fig. 3, furthermore, it is possible, by unthreading the screw 9, to spring open the end pieces 6 and 8 slightly, so as to permit removal of the lens from the rim 2 without removing the temple. The end pieces may be held more securely closed by interlocking projections and recesses 72.

There is a further advantage in reducing the width of the intermediate end-piece portions, instead of using the other thinning expedients, as it then becomes possible not merely to angle the end pieces, but also to adjust them in an in-and-out direction. This renders it unnecessary to file down a temple stop, as the stop 42, when the temple does not open out wide enough, as it becomes possible to adjust the end piece instead. Filing temple stops is objectionable, as the optician frequently files away accidentally the gold filling of adjacent parts of the end pieces at the same time.

By making the end pieces so that they can be easily angled, the dealer is enabled to keep a smaller quantity of goods on hand. At the present day, differently angled end pieces must be separately soldered to different rims, but this requires a larger stock to be kept on hand. Bending with the pliers is objectionable, as before stated, but even such bending is not feasible except for comparatively slight degrees of adjustment. Even so, the end pieces, besides becoming marred, are frequently broken. Such breaking usually occurs just at the junction between the end piece and the lens-holding rim, which is not possible with the present invention.

Further modifications will occur to persons skilled in the art within the spirit and scope of the appended claims.

What is claimed is:

1. A temple having two arms each provided with a projection, the projections extending towards each other and being oppositely disposed and having alined openings, and a member extending through the openings.

2. A temple having a body portion and two adjustable arms extending from the body portion and each provided with a projection, the projections extending towards each other and being oppositely disposed and having alined openings, and a member extending through the openings.

3. A temple having two arms each provided with a tapering projection, the projections extending towards each other with the smaller ends of the projections oppositely disposed and having alined openings, and a member extending through the openings.

4. An ophthalmic mounting having, in combination, a temple having two arms each provided with a projection, the projections extending towards each other and being oppositely disposed and having alined openings, a lens-holding member opposite faces of which are provided with recesses in which the projections are received, the recesses conforming in shape to the shape of the projections to provide bearing surfaces, and a member extending through the openings and the recesses for holding the parts together.

5. An ophthalmic mounting having, in combination, a temple having a body portion and two adjustable arms extending from the body portion and each provided with a projection, the projections extending towards each other and being oppositely disposed and having alined openings, a lens-holding member opposite faces of which are provided with recesses in which the projections are received, the recesses conforming in shape to the shape of the projections to provide bearing surfaces, and a member extending through the openings and the recesses for holding the parts together.

6. An ophthalmic mounting having, in combination, a temple having two arms each provided with a tapering projection, the projections extending towards each other with the smaller ends of the projections oppositely disposed, and a lens-holding member opposite faces of which are provided with tapering recesses in which the projections are received, the recesses conforming in shape to the shape of the projections to provide bearing surfaces.

7. An ophthalmic mounting having, in combination, a body portion and two relatively long adjustable arms extending from the body portion and each provided with a tapering projection, the projections extending towards each other with the smaller ends of the projections oppositely disposed, a lens-holding member opposite faces of which are provided with recesses in which the projections are received, the recesses conforming in shape to the shape of the projections to provide bearing surfaces, and a member extending through the projections to hold them together pivotally against the bearing surfaces, the member being pivotally movable with the temple as a unit.

8. An ophthalmic mounting having, in combination, a body portion and two relatively long adjustable arms extending from the body portion and each provided with a tapering projection, the projections extending towards each other with the smaller ends of the projections oppositely disposed, the projections being provided with alined bores, one of the bores being threaded, a lens-holding member having two oppositely disposed end pieces having outer faces provided with recesses in which the projections are received, the recesses conforming in shape to the shape of the projections to provide bearing surfaces and having oppositely disposed central portions of greater diameter than the diameter of the bores, a screw disposed in the bores and threaded in the threaded bore to hold the projections together pivotally against the bearing surfaces, and means for limiting the pivotal movement of the temple.

9. A temple having three arms, two of the arms each having a bearing projection, the projections extending towards each other and being oppositely disposed, and the third arm having a portion disposed between the projections.

10. An ophthalmic mounting having a temple having three arms two of which are each provided with a projection, the projections extending towards each other and being oppositely disposed, and a lens-holding member opposite faces of which are provided with recesses in which the projections are received, the recesses conforming in shape to the shape of the projections to provide bearing surfaces, the lens-holding member having a recess within which the third arm portion is received.

11. An ophthalmic mounting having, in combination, a split lens rim, two end pieces disposed side by side in contact and secured to the respective ends of the rim, adjacent sides of the end pieces each having a projection, the projections extending towards each other, oppositely disposed intermediate portions of the end pieces between the projections and the rim being of substantially thinner cross section than other portions to facilitate adjustment of the end pieces.

12. An ophthalmic mounting having in combination, a split lens rim, two end pieces disposed side by side in contact and secured to the respective ends of the rim, adjacent sides of the end pieces each having a projection, the projections extending towards each other, oppositely disposed intermediate portions of the end pieces between the projections and the rim being substantially cut away along the contacting faces to reduce the thickness of the end pieces along the said intermediate portions, thereby to facilitate adjustment of the end pieces.

13. An ophthalmic mounting having a split lens rim provided with two end pieces at the respective ends of the rim, the end pieces being disposed side by side in contact, means disposed adjacent to one end of the contacting end pieces for holding the end pieces together, adjacent sides of the end pieces each having a projection, the projections extending towards each other, a temple pivoted to the other end of the end pieces, and the oppositely disposed intermediate portions of the end pieces between the projections and the rim being substantially cut away along the contacting faces to reduce the thickness of the end pieces along the said intermediate portions.

14. An ophthalmic mounting having two end pieces having inner and outer faces and disposed side by side in contact along their inner faces, oppositely disposed intermediate portions of the end pieces being substantially cut away along their outer faces to reduce the thickness of the end pieces along the said intermediate portions, thereby to facilitate adjustment of the end pieces, the portions of the end pieces on both sides of the intermediate portions being of greater thickness.

15. An ophthalmic mounting having a split lens rim provided with two end pieces at the respective ends of the rim and having inner and outer faces, the end pieces being disposed side by side in contact along their inner faces, means disposed adjacent to one end of the contacting end pieces for holding the end pieces together, a temple pivoted to the other end of the end pieces, and the oppositely disposed intermediate portions of the end pieces being substantially cut away along their outer faces to reduce the thickness of the end pieces along the said intermediate portions, the portions of the end pieces on both sides of the intermediate portions being of greater thickness.

16. A temple having three arms one of which is integrally provided with a bearing projection extending towards another arm, the temple being adapted to pivot about the projection as a bearing.

17. A temple having two oppositely disposed arms one of which is provided with a conical countersunk recess in the face opposite to the other arm, the recess serving as a bearing about which the temple is adapted to pivot.

18. An ophthalmic mounting having, in combination, a temple having two arms each provided with a projection, the projections extending towards each other and being oppositely disposed and having alined openings, a lens-holding member provided with recesses in which the projections are received, the recesses conforming in shape to the shape of the projections to provide bearing surfaces, and a member extending through the openings and the recess for holding the parts together.

19. An ophthalmic mounting having, in combination, a temple having two arms having oppositely disposed faces, a lens-holding member disposed between the arms and having faces respectively opposed to the said oppositely disposed faces to form two pair of opposed faces, one on the temple and one on the member, one of the opposed faces of one pair being provided with a projection and the other opposed face of the said pair being provided with a recess in which the projection is received, the recess conforming in shape to the shape of the projection to provide a bearing surface, and means extending through the arms and the member for holding the parts together.

20. An ophthalmic mounting having, in combination, a temple having two arms having oppositely disposed faces, a lens-holding member disposed between the arms and having faces respectively opposed to the said oppositely disposed faces to form two pair of opposed faces, one on the temple and one on the member, one of the opposed faces of each pair being provided with a projection and the other opposed face of the corresponding pair being provided with a recess in which the corresponding projection is received, the recesses conforming in shape to the shape of the corresponding projections to provide bearing surfaces, and means extending through the arms and the member for holding the parts together.

21. An ophthalmic mounting having a split lens rim provided with two end pieces at the respective ends of the rim, the end pieces being disposed side by side in contact, means disposed adjacent to one end of the contacting end pieces for holding the end pieces together, adjacent sides of the end pieces each having a projection, the projections extending towards each other, a temple pivoted to the other end of the end pieces, and the oppositely disposed intermediate portions of the end pieces between the projections and the rim being of substantially thinner cross section than the ends of the end pieces to facilitate adjustment of the end pieces, the portions of the end pieces on both sides of the intermediate portions being of greater thickness.

22. An ophthalmic mounting having a split lens rim provided with two end pieces at the respective ends of the rim and having inner and outer faces, the end pieces being disposed side by side in contact along their inner faces, means disposed adjacent to one end of the contacting end pieces for holding the end pieces together, a temple pivoted to the other end of the end pieces, and the oppositely disposed intermediate portions of the end pieces being of narrower width between the said inner and outer faces than the width of the ends of the end pieces to facilitate adjustment of the end pieces, the portions of the end pieces on both sides of the intermediate portions being of greater thickness.

23. An opthalmic mounting having two end pieces having inner and outer faces and disposed side by side in contact along their inner faces, oppositely disposed intermediate portions of the end pieces being of narrower width between the said inner and outer faces than the width of the ends of the end pieces to facilitate adjustment of the end pieces, the portions of the end pieces on both sides of the intermediate portions being of greater thickness.

FREDERICK ARTHUR STEVENS.